Oct. 21, 1952 J. H. HERMAN, JR 2,614,478
AIR CONDITIONING MEANS FOR MOTOR VEHICLES
Filed Sept. 29, 1949 3 Sheets-Sheet 1
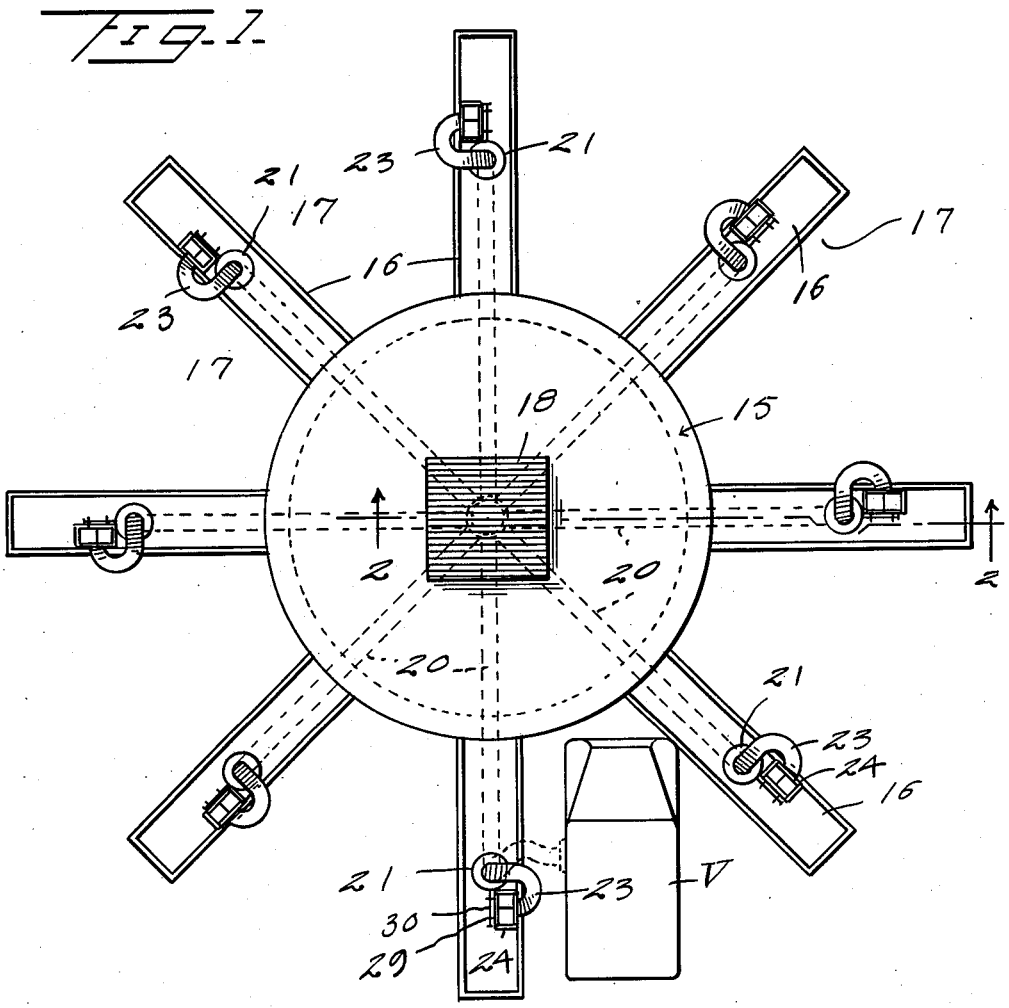
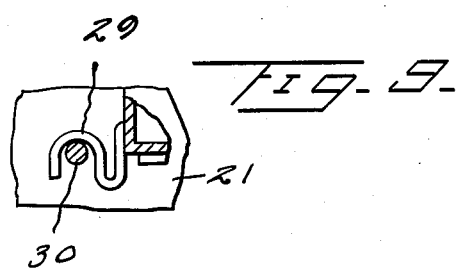
INVENTOR.
J. H. Herman, Jr.
BY
Kimmel & Crowell ATTORNEYS Oct. 21, 1952   J. H. HERMAN, JR   2,614,478
AIR CONDITIONING MEANS FOR MOTOR VEHICLES
Filed Sept. 29, 1949   3 Sheets-Sheet 2
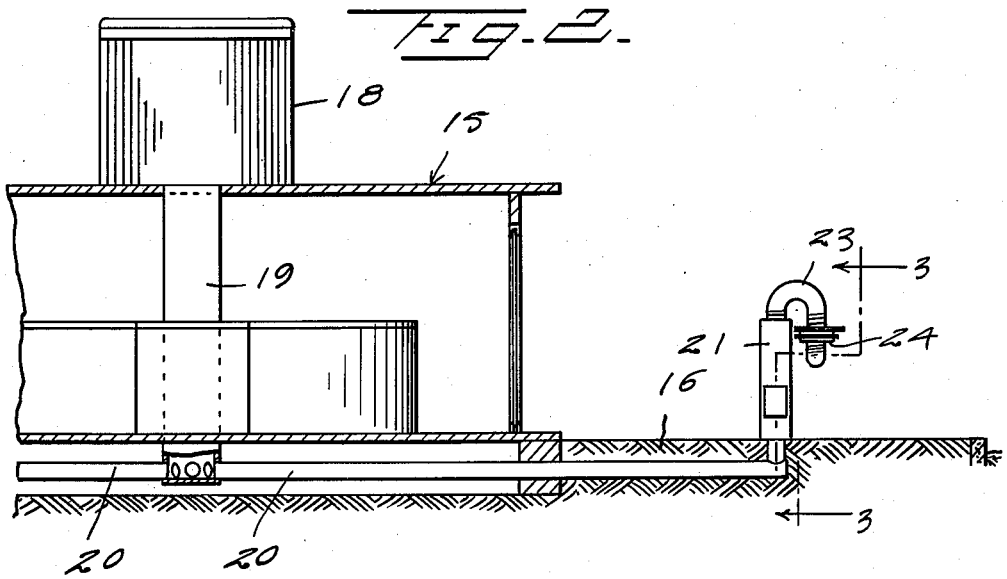
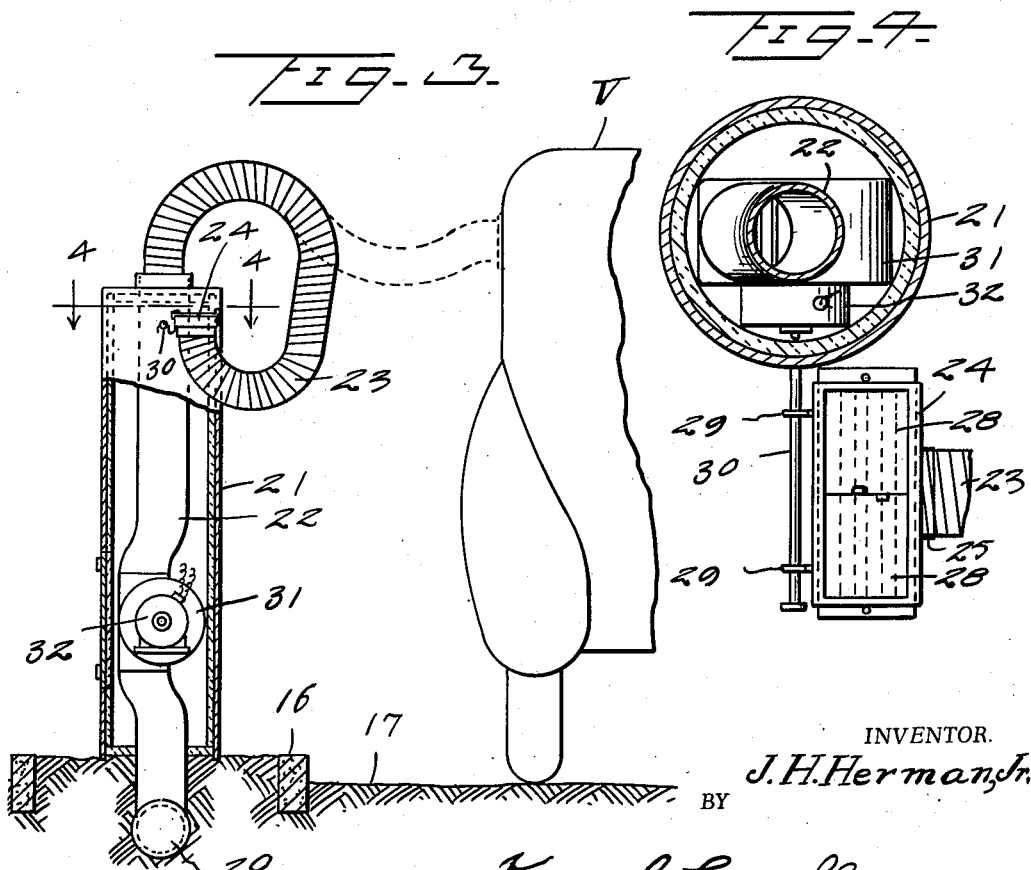
INVENTOR.
J. H. Herman, Jr.
BY
Kimmel & Crowell   ATTORNEYS Oct. 21, 1952  J. H. HERMAN, JR  2,614,478
AIR CONDITIONING MEANS FOR MOTOR VEHICLES
Filed Sept. 29, 1949  3 Sheets-Sheet 3
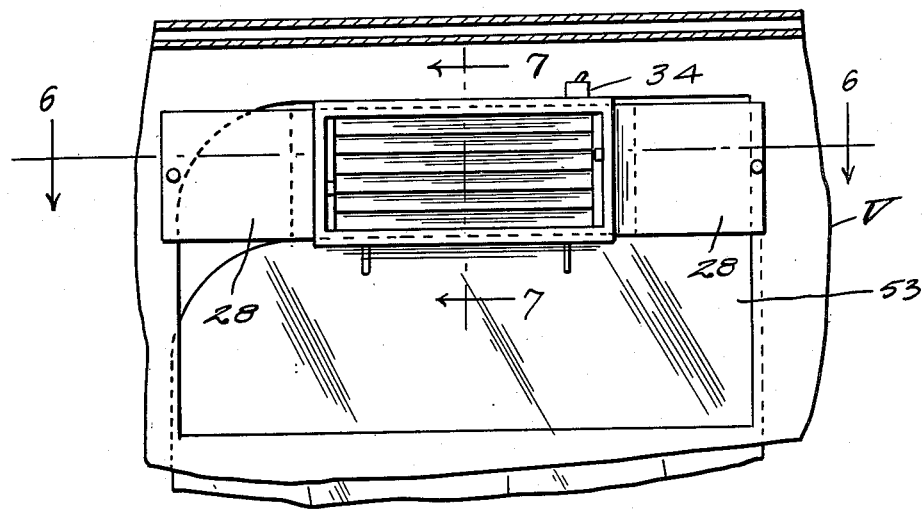
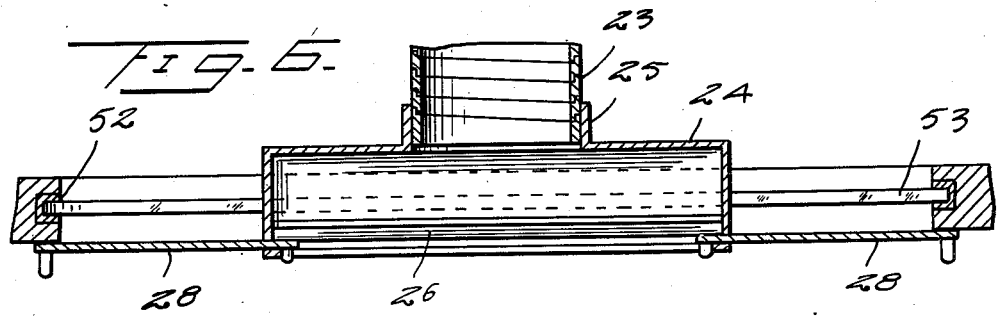
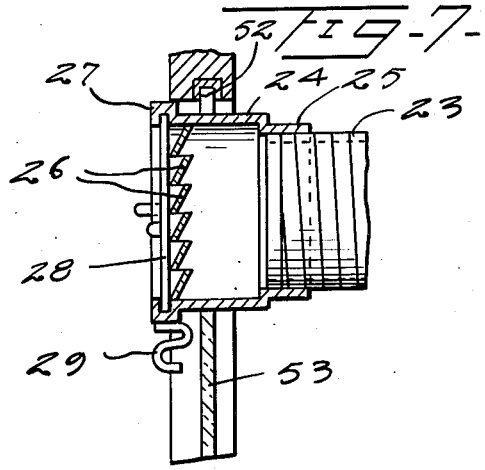
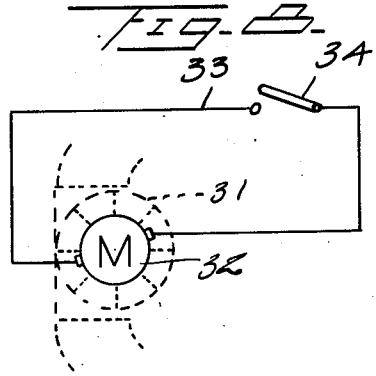
INVENTOR.
J. H. Herman, Jr.
BY
Kimmel & Crowell ATTORNEYS Patented Oct. 21, 1952

2,614,478

UNITED STATES PATENT OFFICE 2,614,478

AIR CONDITIONING MEANS FOR MOTOR VEHICLES

James H. Herman, Jr., Austin, Tex., assignor of one-fourth to Carl Thornquist, Austin, Tex.

Application September 29, 1949, Serial No. 118,541

1 Claim. (Cl. 98—2)

This invention relates to an air conditioning means for motor vehicles.

An object of this invention is to provide an air conditioning means for motor vehicles which is associated with a shopping center, outdoor theatre or the like, wherein the cooled or heated air may be circulated through the vehicle while the vehicle is standing still.

Another object of this invention is to provide an air conditioning unit which is mounted at one side of a driveway or parking space and is adapted to be connected with the vehicle through a window, there being as many units as there are parking spaces and the units are connected to a centrally disposed cooling or heating unit.

A further object of this invention is to provide an air conditioner or heater which is mounted at one side of a driveway or parking space and is horizontally movable to an outwardly extended position for discharging cooled or heated air into the interior of a vehicle through a window.

With the above and other objects in view, my invention consists in the arrangement, combination and details of construction disclosed in the drawings and specifications, and then more particularly pointed out in the appended claim.

In the drawings,

Figure 1 is a plan view of a shopping center or the like having an air cooling means for vehicles associated therewith, Figure 2 is a fragmentary sectional view taken on the line 2—2 of Figure 1, Figure 3 is a fragmentary sectional view taken on the line 3—3 of Figure 2, Figure 4 is a fragmentary sectional view taken on the line 4—4 of Figure 3, Figure 5 is a detail side elevation of one of the cooling outlets disposed in the vehicle window, the vehicle being broken away and partly in section, Figure 6 is a sectional view taken on the line 6—6 of Figure 5, Figure 7 is a fragmentary sectional view taken on the line 7—7 of Figure 5, Figure 8 is a diagrammatic view showing the electric circuit to the blower, Figure 9 is a fragmentary sectional view showing the supporting hook for supporting the outlet when in inoperative position.

Referring to the drawings, the numeral 15 designates generally a shopping center which is of circular configuration in plan and is provided with a plurality of radially disposed walks 16 defining parking areas 17. In order to provide a means whereby vehicles disposed in the parking space 17 may be cooled, I have provided a cooling unit 18 which in the present instance is mounted on top of the shopping center 15. The cooling unit includes a downwardly extending cool air conducting pipe or conduit 19 with which are connected a plurality of radially disposed and horizontally extending pipes 20 which extend outwardly beneath the walks 16.

A tubular standard 21 is disposed in each walk 16 at a point between the inner and outer ends thereof, and the pipe 20 includes a vertically disposed pipe or tubular section 22 extending upwardly through the column 21. A flexible pipe or hose 23 is connected to the upper end of the pipe 22 and the terminal end of the flexible pipe 23 has connected thereto a rectangular boxing 24 which is formed with an annular flange 25 engaging about the outer end of the flexible pipe 23.

The housing or box 24 has mounted in the outer end thereof a plurality of louvres 26 which are pivotally connected together so that the louvres may be rocked to any desired open position or may be rocked to a closed position. The box or housing 24 also includes upper and lower U-shaped guides 27 within which horizontally slidable panels 28 are mounted. The panels 28 when disposed in inoperative position are adapted, as shown in Figure 4, to close the front or open side of the housing 24. The panels 28 are adapted to be moved outwardly, as shown in Figures 5 and 6, thereby uncovering the louvres 26, and the panels 28 are adapted to engage on the outer side of the vehicle window opening so as to substantially cover the spaces at the opposite ends of the housing 24.

The terminal end of the flexible hose or pipe 23 is adapted to be supported from the hollow standard 21 by means of a pair of hooks 29 which are secured to the box or housing 24, and the hooks 29 are adapted to engage over a horizontally disposed supporting bar 30 which is fixed to the upper portion of the standard 21.

In order to provide a means whereby the cool or heated air may be forcibly moved through the upper portion of the pipe 22 and the flexible hose or pipe 23 for discharge into the interior of the vehicle, a blower 31 is interposed in the pipe 22 and has a motor 32 connected therewith. The motor 32 is interposed in an electric circuit 33 within which a switch 34 is interposed. If desired, the switch 34 may be associated with the supporting bar 30 or with a coin actuated means (not shown) so that the motor 32 will only be operated when the housing 24 is mounted in a vehicle window. As shown in Figure 5, the switch 34 may be mounted on the box or housing 24.

In the use and operation of this air conditioning means, the vehicle V is disposed in the parking space 17 closely adjacent the post or supporting member 21. The housing 24 is removed from the supporting bar 30 and is then disposed in the open window of the vehicle V. The housing 24 includes a pair of upstanding pins 52 which are adapted to engage in the upper channels of the window frame so that the housing 24 will be firmly disposed in the window opening when the transparent panel 53 is raised to firmly bind the housing 24 in the upper portion of the window frame structure. When the motor 32 is operating, the heat exchanging medium passing through the pipes 20 and 22 will be discharged into the interior of the vehicle so that the vehicle will be either cooled or heated, depending on the air passing through the pipes 20 and 22.

I do not mean to confine myself to the exact details of construction herein disclosed, but claim all variations falling within the purview of the appended claim.

What I claim is:

An air conditioner for vehicles comprising a stationary air cooling unit, an air conducting pipe extending from said unit, an upright hollow post, a vertical pipe within said post connected to said first pipe, a flexible tubular member connected at one end to said vertical pipe, a rectangular exhaust housing including rear walls, and slotted side walls, said rear walls having an opening therein, and a flange around said opening connected to the other end of said flexible member, said housing including an open front forming an outlet, and louvres across the outlet, a pair of closure plates extending transversely of said outlet and slidably extended through the slots in said side wall housing, said closure plates when in extended position opening said outlet and forming laterally projecting extensions of said housing whereby to cooperate with said housing in closing a vehicle window opening, and means carried by said post for supporting the said housing when the latter is disengaged from a vehicle window.

JAMES H. HERMAN, Jr.

REFERENCES CITED

The following references are of record in the file of this patent:

UNITED STATES PATENTS

| Number | Name | Date |
|---|---|---|
| 940,590 | Gay | Nov. 16, 1909 |
| 984,553 | Gay | Feb. 21, 1911 |
| 1,605,080 | Stark | Nov. 2, 1926 |
| 1,744,154 | Bettag | Jan. 21, 1930 |
| 1,750,789 | Thompson | Mar. 18, 1930 |
| 2,091,594 | Innes | Aug. 31, 1937 |
| 2,436,713 | Cody | Feb. 24, 1948 |
| 2,463,339 | Wetzel et al. | Mar. 1, 1949 |
| 2,469,986 | Phyfe | May 10, 1949 |
| 2,529,425 | Sharp | Nov. 7, 1950 |